United States Patent
Maniktala et al.

(10) Patent No.: US 10,804,726 B2
(45) Date of Patent: Oct. 13, 2020

(54) WHEEL COILS AND CENTER-TAPPED LONGITUDINAL COILS FOR WIRELESS POWER TRANSFER

(71) Applicant: ChargEdge, Inc., Fremont, CA (US)

(72) Inventors: Disha Maniktala, Fremont, CA (US); Sanjaya Maniktala, Fremont, CA (US)

(73) Assignee: CHARGEDGE, INC., Fremont, CA (US)

( * ) Notice: Subject to any disclaimer, the term of this patent is extended or adjusted under 35 U.S.C. 154(b) by 89 days.

(21) Appl. No.: 15/866,786

(22) Filed: Jan. 10, 2018

(65) Prior Publication Data
US 2018/0205260 A1    Jul. 19, 2018

Related U.S. Application Data

(60) Provisional application No. 62/446,456, filed on Jan. 15, 2017.

(51) Int. Cl.
*H02J 7/02*     (2016.01)
*H02J 50/12*    (2016.01)
(Continued)

(52) U.S. Cl.
CPC .......... *H02J 7/025* (2013.01); *H01F 27/2895* (2013.01); *H01F 38/14* (2013.01);
(Continued)

(58) Field of Classification Search
CPC ........... H01F 27/2895; H01F 2003/005; H01F 38/14; H02J 7/025; H02J 5/005; H02J 50/12; H04B 5/0037
See application file for complete search history.

(56) References Cited

U.S. PATENT DOCUMENTS 6,212,430 B1    4/2001   Kung
7,948,781 B2 *  5/2011   Esaka ................. H01F 38/14
                                           363/67
(Continued)

FOREIGN PATENT DOCUMENTS

WO    WO2013122483 A1    8/2013
WO    WO2013154440 A1    10/2013

OTHER PUBLICATIONS

Wireless Power Consortium, "Qi System Description Wireless Power Transfer," vol. I: Low Power, Part 1: Interface Definition, Version 1.1.2, Jun. 2013.

(Continued)

*Primary Examiner* — Alfonso Perez Borroto
*Assistant Examiner* — Esayas G Yeshaw
(74) *Attorney, Agent, or Firm* — White & Case LLP

(57) ABSTRACT

In one embodiment, a wireless power transfer coil structure comprises a wheel core comprising an annulus portion and at least two spoke portions arranged substantially symmetrically with respect to a geometric center of the annulus portion, the wheel core formed from a magnetic material, and a coil located on an outer surface of the annulus portion of the wheel core. In one embodiment, the wireless power transfer coil structure further comprises at least one solenoidal coil wound around the at least two spoke portions of the wheel core. In one embodiment, the at least one solenoidal coil is wound around one of the at least two spoke portions of the wheel core in a first direction and wound around another of the at least two spoke portions of the wheel core in the first direction. In one embodiment, the at least one solenoidal coil is wound around one of the at least two spoke portions of the wheel core in a first direction and wound around another of the at least two spoke portions of (Continued)

the wheel core in a second direction different from the first direction.

19 Claims, 16 Drawing Sheets

(51) Int. Cl.
*H01F 38/14* (2006.01)
*H02J 5/00* (2016.01)
*H04B 5/00* (2006.01)
*H01F 27/28* (2006.01)
*H01F 3/00* (2006.01)

(52) U.S. Cl.
CPC .............. *H02J 5/005* (2013.01); *H02J 50/12* (2016.02); *H04B 5/0037* (2013.01); *H01F 2003/005* (2013.01)

(56) References Cited

U.S. PATENT DOCUMENTS

| | | | |
|---|---|---|---|
| 9,276,437 B2 | 3/2016 | Partovi et al. | |
| 9,548,621 B2 | 1/2017 | Asanuma et al. | |
| 2005/0073466 A1 | 4/2005 | Karlsen | |
| 2006/0061324 A1 | 3/2006 | Oglesbee | |
| 2009/0096413 A1 | 4/2009 | Partovi et al. | |
| 2010/0181841 A1 | 7/2010 | Azancot et al. | |
| 2010/0259217 A1 | 10/2010 | Baarman et al. | |
| 2011/0115429 A1 | 5/2011 | Toivola et al. | |
| 2011/0210617 A1* | 9/2011 | Randall | H01F 3/10 307/104 |
| 2011/0217927 A1 | 9/2011 | Ben-Shalom et al. | |
| 2011/0304216 A1 | 12/2011 | Baarman | |
| 2012/0154086 A1 | 6/2012 | Willemsen et al. | |
| 2013/0043734 A1 | 2/2013 | Stone et al. | |
| 2013/0093252 A1 | 4/2013 | Norconk et al. | |
| 2013/0175877 A1 | 7/2013 | Abe et al. | |
| 2013/0214591 A1 | 8/2013 | Miller et al. | |
| 2013/0249479 A1 | 9/2013 | Partovi | |
| 2013/0307468 A1 | 11/2013 | Lee et al. | |
| 2014/0021798 A1* | 1/2014 | Kesler | H01F 38/14 307/104 |
| 2014/0070622 A1 | 3/2014 | Keeling et al. | |
| 2014/0167688 A1 | 6/2014 | Doyle et al. | |
| 2014/0232330 A1 | 8/2014 | Robertson et al. | |
| 2014/0266031 A1 | 9/2014 | Sasaki | |
| 2015/0091388 A1 | 4/2015 | Golko et al. | |
| 2015/0295416 A1 | 10/2015 | Li | |
| 2015/0372493 A1 | 12/2015 | Sankar | |
| 2016/0043571 A1* | 2/2016 | Kesler | H02J 50/12 307/104 |
| 2016/0111887 A1 | 4/2016 | Jeong | |

OTHER PUBLICATIONS

Maniktala, S., "Fixing EMI across the Board," EE Times, Nov. 5, 2003, http://www.eetimes.com/document.asp?doc_id=1230444.

Maniktala, S., "More on Designing Reliable Electronic Ballasts," EE Times, Apr. 20, 2005, http://www.eetimes.com/document.asp?doc_id=1272231.

Maniktala, S. "The Confluence of Resonant Switching Topologies and Wireless Charging," presented at ISSCC 2015, San Francisco, CA, Feb. 26, 2015.

Maniktala, S., "WPT Breaks All Connections, Part 1," EDN Network, Mar. 9, 2015, http://www.edn.com/design/power-management/4438850/WPT-breaks-all-connections—Part-1.

Maniktala, S., "WPT Breaks All Connections, Part 2," EDN Network, Mar. 14, 2015, http://www.edn.com/design/power-management/4438924/WPT-breaks-all-connections--Part-2.

Maniktala, S., "WPT Breaks All Connections, Part 3," EDN Network, Apr. 6, 2015, http://www.edn.com/design/power-management/4439125/WPT-breaks-all-connections—Part-3.

Power Matters Alliance, "PMA Inductive Wireless Power and Charging Transmitter Specification—System Release 1," PMA-TS-0003-0 v2.00, Apr. 24, 2014.

Power Matters Alliance, "PMA Inductive Wireless Power and Charging Receiver Specification—System Release 1," PMA-TS-0001-0 v1.00, Nov. 16, 2013.

"Notification of Transmittal of the International Search Report and the Written Opinion of the International Searching Authority," Int'l Appl. No. PCT/US2016/066105, dated Feb. 7, 2017.

"Notification of Transmittal of the International Search Report and the Written Opinion of the International Searching Authority," Int'l Appl. No. PCT/US2017/020465, dated May 11, 2017.

"Notification of Transmittal of the International Search Report and the Written Opinion of the International Searching Authority," Int'l Appl. No. PCT/US2016/024483, dated Jun. 20, 2016.

"Notification of Transmittal of the International Search Report and the Written Opinion of the International Searching Authority," Int'l Appl. No. PCT/US17/49756, dated Nov. 9, 2017.

* cited by examiner

WHEEL COILS AND CENTER-TAPPED LONGITUDINAL COILS FOR WIRELESS POWER TRANSFER

CROSS-REFERENCE TO RELATED APPLICATION

This application claims the benefit of U.S. Provisional Patent Application No. 62/446,456, entitled "Wheel Coils for Inductive Power Transfer and Center-Tapped Longitudinal Coils," filed on Jan. 15, 2017, the subject matter of which is hereby incorporated by reference in its entirety.

FIELD OF THE INVENTION

The invention relates generally to wireless power transfer and more particularly to wheel coils and center-tapped longitudinal coils for wireless power transfer.

BACKGROUND

Electronic devices typically require a connected (wired) power source to operate, for example, battery power or a wired connection to a direct current ("DC") or alternating current ("AC") power source. Similarly, rechargeable battery-powered electronic devices are commonly charged using a wired power-supply that connects the electronic device to a DC or AC power source. The limitation of these devices is the need to directly connect the device to a power source using wires.

Wireless power transfer (WPT) involves the use of time-varying magnetic fields to wirelessly transfer power from a source to a device. Faraday's law of magnetic induction provides that if a time-varying current is applied to one coil (e.g., a transmitter coil) a voltage will be induced in a nearby second coil (e.g., a receiver coil). The voltage induced in the receiver coil can then be rectified and filtered to generate a stable DC voltage for powering an electronic device or charging a battery. The receiver coil and associated circuitry for generating a DC voltage can be connected to or included within the electronic device itself such as a smartphone.

The Wireless Power Consortium (WPC) was established in 2008 to develop the Qi inductive power standard for charging and powering electronic devices. Powermat is another well-known standard for WPT developed by the Power Matters Alliance (PMA). The Qi and Powermat near-field standards operate in the frequency band of 100-400 kHz. The problem with near-field WPT technology is that typically only 5 Watts of power can be transferred over the short distance of 2 to 5 millimeters between a power source and an electronic device, though there are ongoing efforts to increase the power. For example, some concurrently developing standards achieve this by operating at much higher frequencies, such as 6.78 MHz or 13.56 MHz. Though they are called magnetic resonance methods instead of magnetic induction, they are based on the same underlying physics of magnetic induction. There also have been some market consolidation efforts to unite into larger organizations, such as the AirFuel Alliance consisting of PMA and the Rezence standard from the Alliance For Wireless Power (A4WP), but the technical aspects have remained largely unchanged.

In many wireless power transfer systems, a single spiral receiver coil is placed in close proximity to a single spiral transmitter coil emitting a magnetic field. The flux pattern of the magnetic field between the transmitter coil and the receiver coil is commonly not uniform, or "fuzzy," and thus the transfer of power from the transmitter coil to the receiver coil is not very efficient. Thus there is a need to improve the efficiency of wireless power transfer by improving magnetic coupling between a wireless power transmitter and a wireless power receiver.

SUMMARY

In one embodiment, a wireless power transfer coil structure comprises a wheel core comprising an annulus portion and at least two spoke portions arranged substantially symmetrically with respect to a geometric center of the annulus portion, the wheel core formed from a magnetic material, and a coil located on an outer surface of the annulus portion of the wheel core. In one embodiment, the wireless power transfer coil structure further comprises at least one solenoidal coil wound around the at least two spoke portions of the wheel core. In one embodiment, the at least one solenoidal coil is wound around one of the at least two spoke portions of the wheel core in a first direction and wound around another of the at least two spoke portions of the wheel core in the first direction. In one embodiment, the at least one solenoidal coil is wound around one of the at least two spoke portions of the wheel core in a first direction and wound around another of the at least two spoke portions of the wheel core in a second direction different from the first direction.

In one embodiment, the wheel core comprises at least four spoke portions arranged substantially symmetrically around the geometric center of the annulus portion and the solenoidal coil is wound around a first pair of the at least four spoke portions, and the wireless power transfer coil structure further comprises a second solenoidal coil wound around a second pair of the at least four spoke portions. In one embodiment, the coil located on the annulus portion of the wheel core, the solenoidal coil, and the second solenoidal coil are coupled together in series. In one embodiment, the coil located on the annulus portion of the wheel core is coupled to a first rectifier circuit, the solenoidal coil is coupled to a second rectifier circuit, and the second solenoidal coil is coupled to a third rectifier circuit.

In one embodiment, a wireless power transfer coil structure comprises a wheel core comprising a first annulus portion, a second annulus portion, at least two spoke portions arranged substantially symmetrically with respect to a center of the first annulus portion, and at least two spoke portions arranged substantially symmetrically with respect to a center of the second annulus portion, the wheel core being made of a magnetic material, a first coil located on an outer surface of the first annulus portion of the wheel core, and a second coil located on an outer surface of the second annulus portion of the wheel core.

DETAILED DESCRIPTION

Figure 1A:
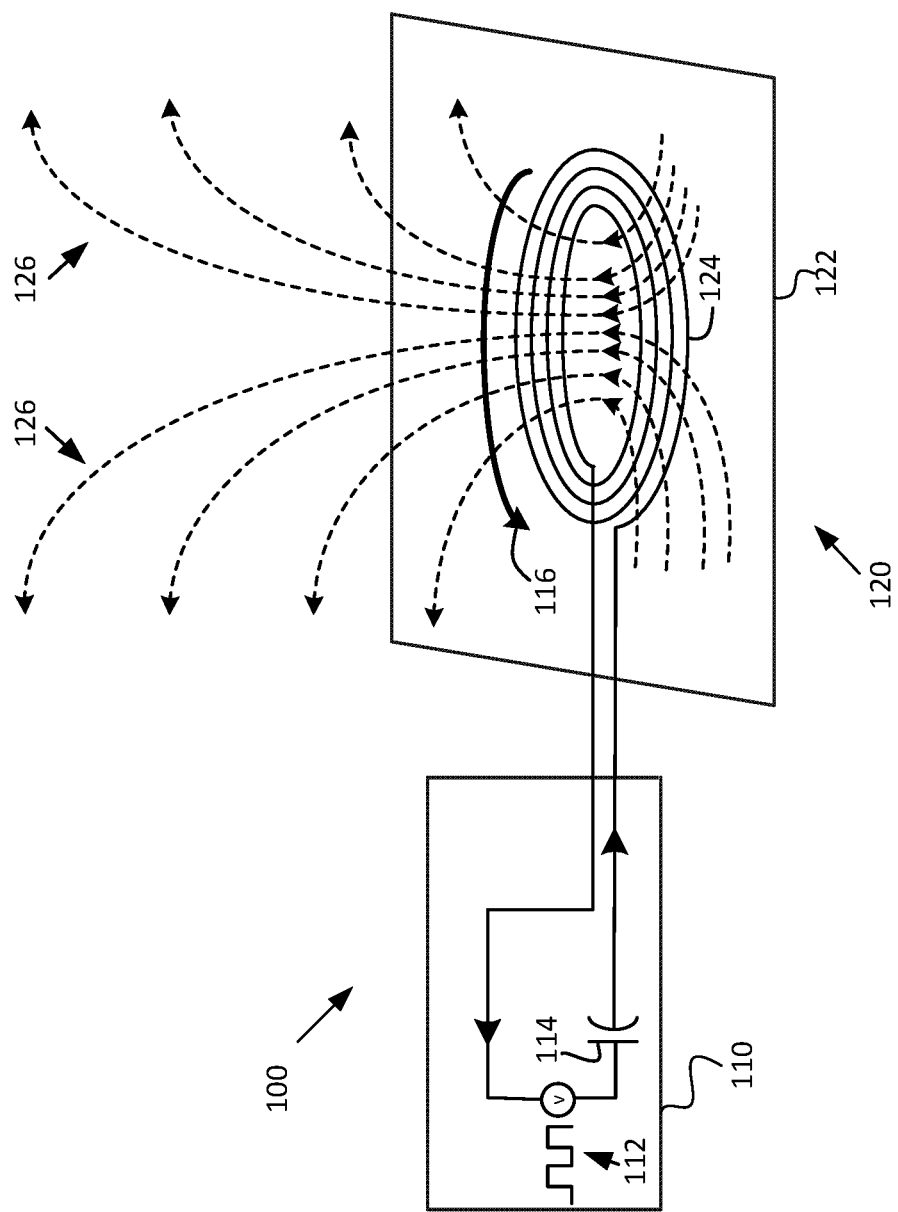
FIG. 1A is a diagram of one embodiment of a single coil wireless power transmitter, according to the invention.

FIG. 1A is a diagram of one embodiment of a single coil wireless power transmitter 100, according to the invention. Transmitter 100 includes, but is not limited to, a power circuit 110 and a transmitter coil structure 120. Power circuit 110 generates an AC signal 112 of a defined voltage magnitude. AC signal 112 can be, but is not limited to, a square wave, a sinusoidal wave, a triangular wave, or a sawtooth wave. Power circuit 112 includes a capacitor 114. Transmitter coil structure 120 includes a coil 124 and a layer of magnetic material (magnetic layer) 122. Magnetic layer 122 can be ferrite or any other magnetic material known in the art. Coil 124 can be formed of wire or traces on a printed circuit board using conductive material such as copper, gold, or any other conductive material known in the art.

Power circuit 110 generates AC signal 112, which flows through capacitor 114 to coil 124. When a current 116 flows through coil 124 in a counter-clockwise spatial direction as shown in FIG. 1A, the counter-clockwise flow of current 116 through coil 124 generates a magnetic field represented by flux lines 126. According to the "right-hand-rule," the counter-clockwise flow of current 116 through coil 124 causes flux lines 126 to flow in an upward spatial direction. When a current flows through coil 124 in a clockwise spatial direction, coil 124 generates a magnetic field with flux lines that flow in a downward spatial direction (not shown). Flux lines 126 generated by single-coil transmitter 100 are referred to herein as "vertical" lines of flux. The resonant frequency of transmitter 100 is a function of the inductance of coil 124 and the capacitance of capacitor 114. The time-varying magnetic field generated by transmitter 100 can transfer power to a wireless power receiver.

Figure 1B:
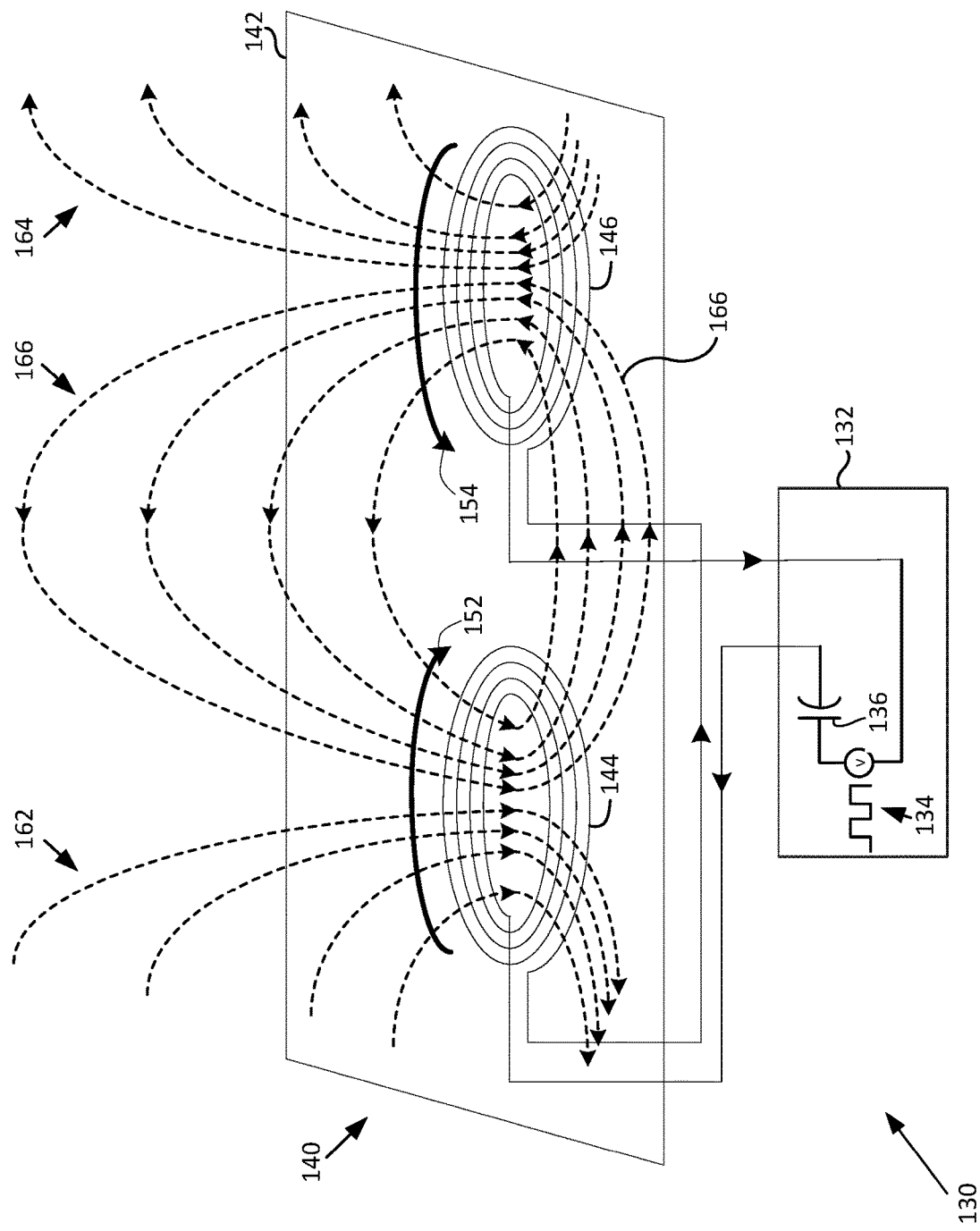
FIG. 1B is a diagram of one embodiment of an opposite polarity coil wireless power transmitter, according to the invention.

FIG. 1B is a diagram of one embodiment of an opposite polarity coil wireless power transmitter 130, according to the invention. Transmitter 130 includes, but is not limited to, a power circuit 132 and an opposite polarity coil structure 140. Power circuit 132 generates an AC signal 134 of a defined voltage magnitude. AC signal 134 can be, but is not limited to, a square wave, a sinusoidal wave, a triangular wave, or a sawtooth wave. Power circuit 132 includes a capacitor 136. Opposite polarity coil structure includes a coil 144 and a coil 146, which are magnetically coupled together by a substantially planar layer of magnetic material (magnetic layer) 142. Magnetic layer 142 can be ferrite or any other magnetic material known in the art. Coil 144 and coil 146 are preferably identical coils with the same number of turns, the same area, and wound in the same direction. Coil 144 and coil 146 are both wound in the clockwise direction but both coils could alternatively be wound in the counter-clockwise direction. Coil 144 and coil 146 can be formed of wire or traces on a printed circuit board using conductive material such as copper, gold, or any other conductive material known in the art.

Power circuit 132 generates AC signal 134, which flows through capacitor 136 to coil 144. When a current 152 flows through coil 144 in a clockwise spatial direction as shown in FIG. 1B, the clockwise flow of current 152 through coil 144 generates a magnetic field represented by flux lines 162. According to the "right-hand-rule," the clockwise flow of current 152 through coil 144 causes flux lines 162 to flow in a downward spatial direction. When a current 154 flows through coil 146 in a counter-clockwise spatial direction as shown in FIG. 1B, the counter-clockwise flow of current 154 through coil 146 generates a magnetic field represented by flux lines 164. According to the "right-hand-rule," the counter-clockwise flow of current 154 through coil 146 causes flux lines 164 to flow in an upward spatial direction. The resonant frequency of transmitter 130 is a function of the inductance of coil 144 and coil 146, and the capacitance of capacitor 136.

In the FIG. 1B embodiment, coil 144 is coupled in series with coil 146 and so at a given point in time current 152 is equivalent in magnitude to current 154 but flows in an opposite spatial direction. If coil 144 and coil 146 are substantially identical, the flow of current 152 through coil 144 generates a magnetic field substantially equivalent in magnitude to the magnetic field generated by the flow of current 154 through coil 146. Because current 152 and current 154 are flowing in opposite directions at any given point in time, the magnetic field generated by current 152 is in a different direction than the magnetic field generated by current 154 (i.e., the magnetic fields have different polarity). Further, because flux lines 162 and flux lines 164 are flowing in opposite directions, the magnetic reluctance between flux lines 162 and flux lines 164 is low, causing flux lines 162 and flux lines 164 between coil 144 and coil 146 to attract to each other. Flux lines 162 and flux lines 164 magnetically couple between coil 144 and coil 146 to form closed flux lines 166. Closed flux lines 166 generated by opposite polarity coil transmitter 130 are referred to herein as "horizontal" flux lines. Although in the embodiment of FIG. 1B coil 144 and coil 146 are coupled in series, in other embodiments coil 144 and coil 146 are coupled together in parallel to achieve the same result of a magnetic field with closed flux lines between coil 144 and coil 146. Embodiments of an opposite polarity coil transmitter are further described in U.S. patent application Ser. No. 15/082,533, entitled "Wireless Power Transfer Using Multiple Coil Arrays," the subject matter of which is hereby incorporated by reference in its entirety.

Figure 2A:
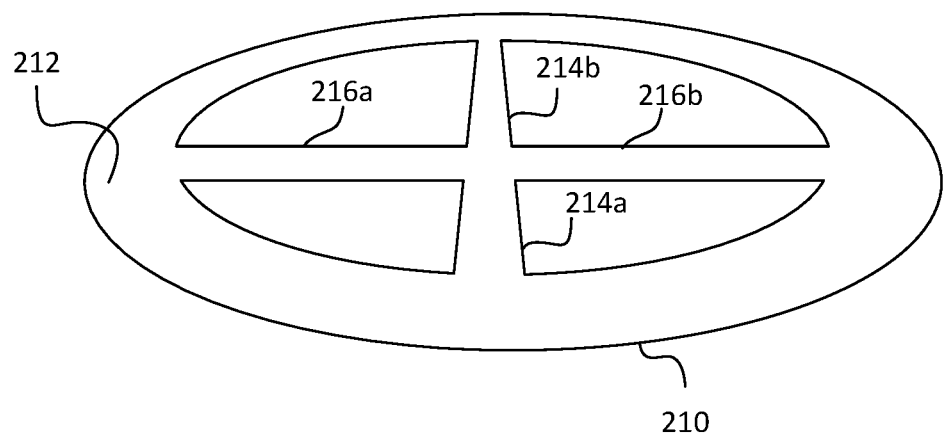
FIG. 2A is a diagram of one embodiment of a wheel core of a wheel coil structure for wireless power transfer, according to the invention.

FIG. 2A is a diagram of one embodiment of a wheel core 210 of a wheel coil structure for wireless power transfer, according to the invention. Wheel core 210 is formed from a magnetic material such as ferrite. Wheel core 210 includes an annulus (ring) portion 212 and spoke portions 214a, 214b, 216a, and 216b. In other embodiments, wheel core 210 includes a different number of spoke portions, for example two, six, or eight, arranged symmetrically with respect to a geometric center of wheel core 210. In one embodiment, wheel core 210 has a thickness of approximately 0.5 to 5 millimeters. In the FIG. 2A embodiment, wheel core 210 is formed from a single piece of magnetic material. In other embodiments, wheel core 210 is formed by assembling separate pieces of magnetic material.

Figure 2B:
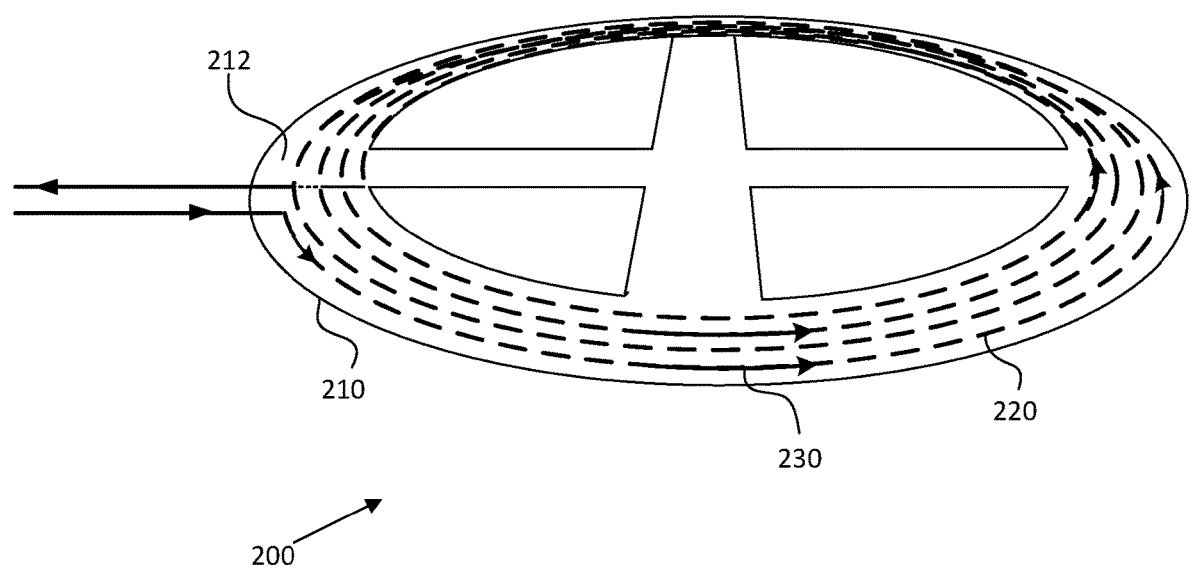
FIG. 2B is a diagram of one embodiment of a wheel coil structure for wireless power transfer, according to the invention.

FIG. 2B is a diagram of one embodiment of a wheel coil structure 200 for wireless power transfer, according to the invention. Wheel coil structure 200 includes, but is not limited to, a wheel core 210 and a coil 220. Coil 220 is a spiral coil located on an outer surface of annulus portion 212 of wheel core 210; FIG. 2B shows coil 220 on the underside of annulus portion 212, which in the FIG. 2B embodiment is configured to face a transmitting surface of a wireless power transmitter during power transfer. In one embodiment, coil 220 is attached to the outer surface of annulus portion 212 with an adhesive. When a current 230 flows in coil 220 in a counter-clockwise spatial direction, wheel coil structure 200 emits a magnetic field with flux lines (not shown) that flow in an upward spatial direction. Wheel coil structure 200 can be implemented as a wireless power receiver coil or a wireless power transmitter coil. When implemented as a wireless power receiver coil structure, a magnetic field produced by a wireless power transmitter may induce current 230 in wheel coil structure 200 when wheel coil structure 200 is oriented so that coil 220 is facing a transmitting surface of the wireless power transmitter. When implemented as a wireless power transmitter coil structure, wheel coil structure 200 receives current 230 from a power circuit.

Figure 2C:
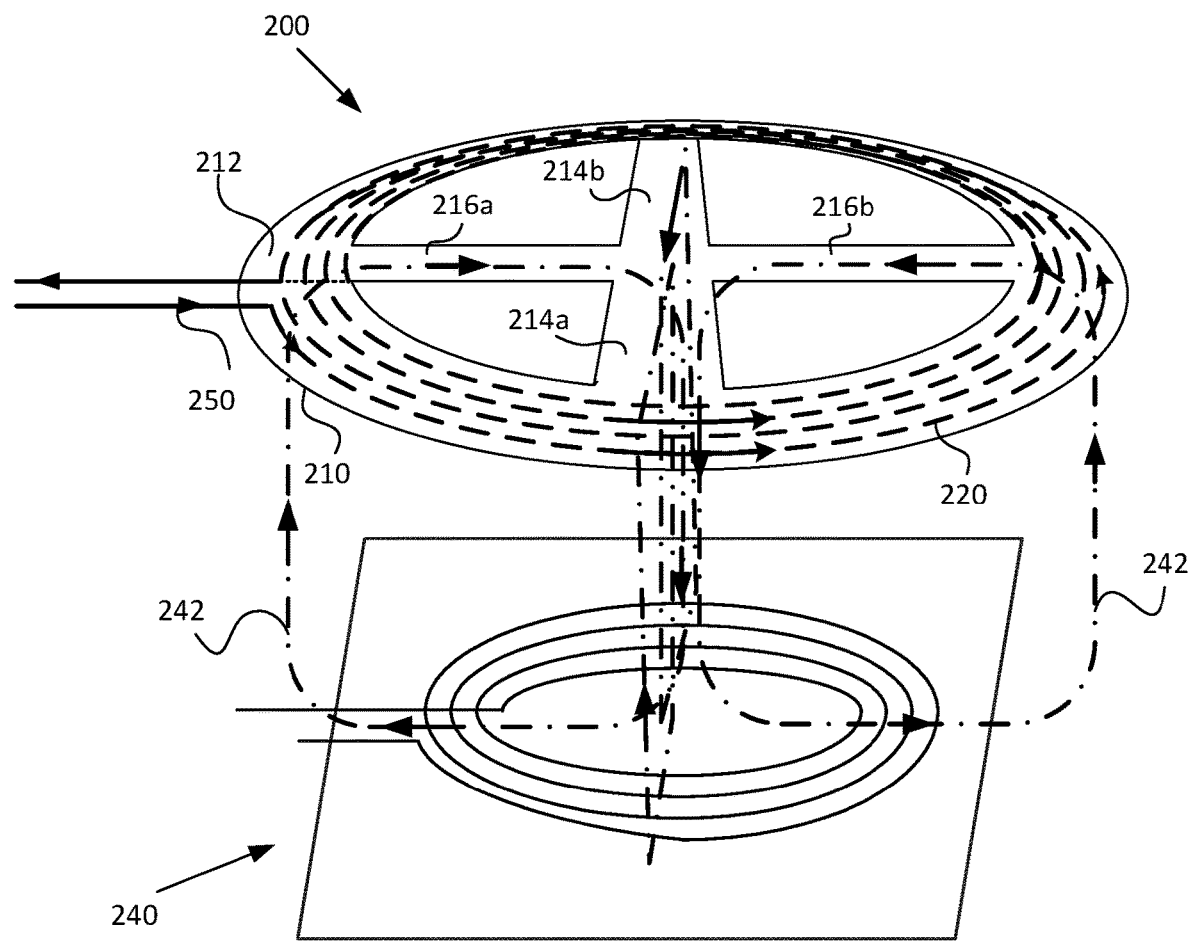
FIG. 2C is a diagram of one embodiment of a wheel coil structure implemented as a wireless power receiver coil, according to the invention.

FIG. 2C is a diagram of one embodiment of wheel coil structure 200 implemented as a wireless power receiver coil, according to the invention. A wireless power transmitter coil structure 240 generates a time-varying magnetic field represented by flux lines 242. The time-varying magnetic field generated by transmitter coil structure 240 induces a time-varying current 250 in coil 220. Spoke portions 214a, 214b, 216a, and 216b of wheel core 210 enhance the coupling of flux lines 242 with wheel coil structure 200, which enhances the transfer of power from transmitter coil structure 240 to wheel coil structure 200. In one embodiment, coil 220 is coupled to a receiver circuit (not shown) such that current 250 is input to the receiver circuit that produces an output voltage that can be used to charge a battery or power an electronic device.

Figure 3A:
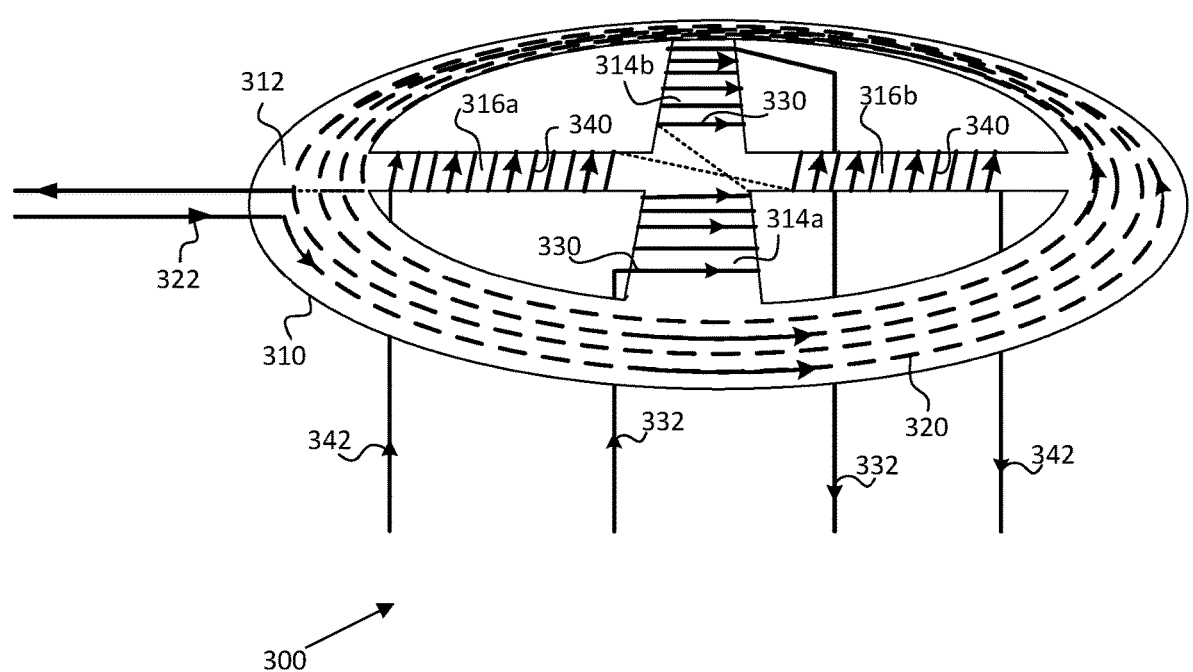
FIG. 3A is a diagram of one embodiment of a wheel coil structure for wireless power transfer, according to the invention.

FIG. 3A is a diagram of one embodiment of a wheel coil structure 300 for wireless power transfer, according to the invention. Wheel coil structure 300 includes, but is not limited to, a wheel core 310, a coil 320, a coil 330, and a coil 340. Coil 320 is a spiral coil shown as being located on the underside of an outer surface of an annulus portion 312 of wheel core 310, which in the FIG. 3A embodiment is configured to face a transmitting surface of a wireless power transmitter during power transfer. In one embodiment, coil 320 is attached to the outer surface of annulus portion 312 with an adhesive. Coil 330 is a solenoidal coil wrapped around a spoke portion 314a and a spoke portion 314b of wheel core 310. Coil 330 is wound around spoke portions 314a and 314b in such a way that when a current 332 is flowing in a first spatial direction in a portion of coil 330 wound around spoke portion 314a, current 332 is also flowing in the first spatial direction in a portion of coil 330 wound around spoke portion 314b. For example, if current 332 is flowing in the portion of coil 330 wound around spoke portion 314a in a clockwise spatial direction then current 332 is also flowing in the portion of coil 330 wound around spoke portion 314b in a clockwise spatial direction. Coil 340 is a solenoidal coil wrapped around a spoke portion 316a and a spoke portion 316b of wheel core 310. Coil 340 is wound around spoke portions 316a and 316b in such a way that when a current 342 is flowing in a first spatial direction in a portion of coil 340 wound around spoke portion 316a, current 342 is also flowing in the first spatial direction in a portion of coil 340 wound around spoke portion 316b.

Figure 3B:
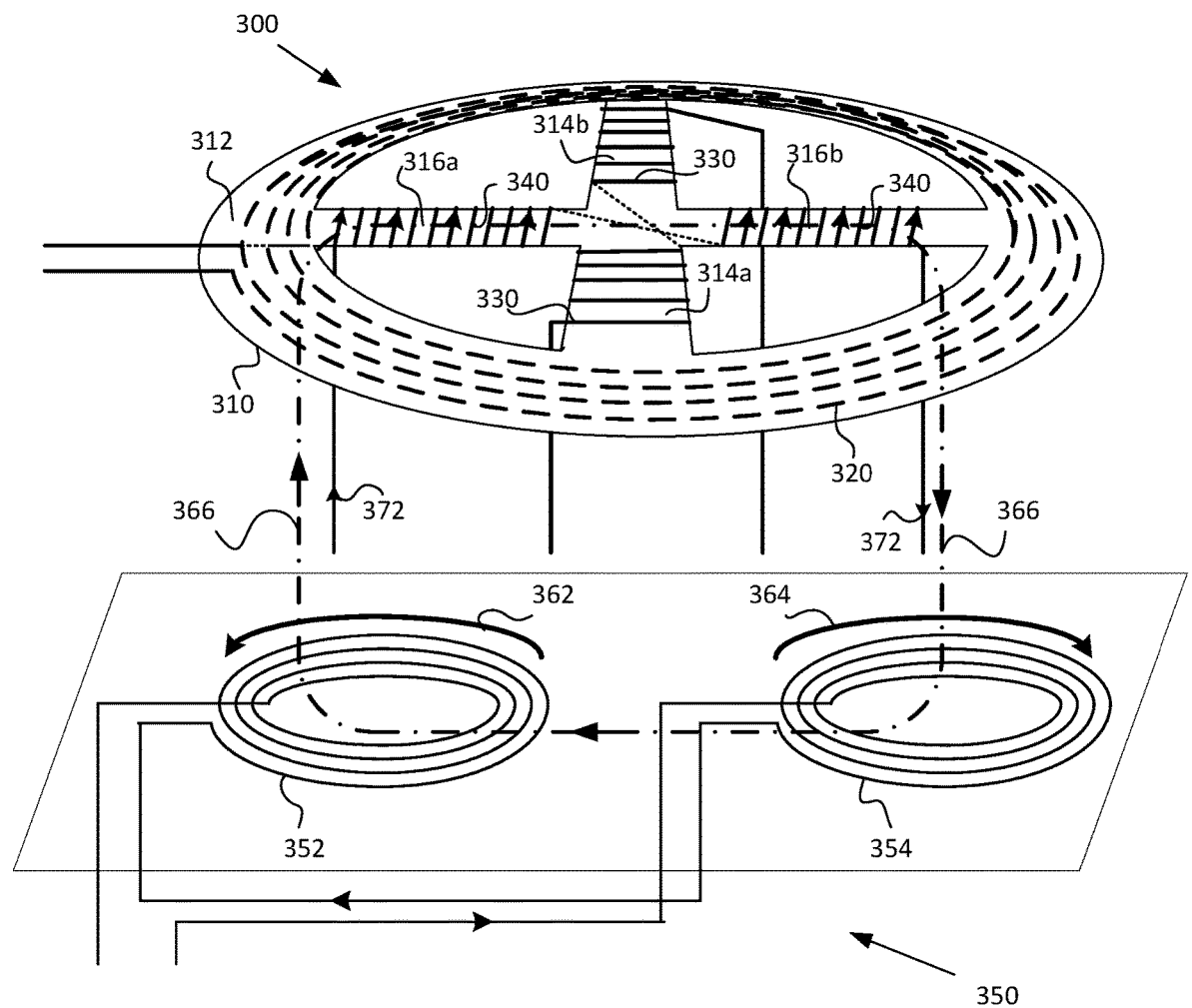
FIG. 3B is a diagram of one embodiment of a coil of the wheel coil structure of FIG. 3A receiving power from an opposite polarity coil wireless power transmitter, according to the invention.

In one embodiment, wheel coil structure 300 is implemented as a wireless power receiver coil structure. FIG. 3B is a diagram of one embodiment of a coil of the wheel receiver coil structure of FIG. 3A receiving power from an opposite polarity coil wireless power transmitter, according to the invention. An opposite polarity coil wireless power transmitter coil structure 350 generates a time-varying magnetic field with closed (or "horizontal") flux lines 366. A current 362 flows in a coil 352 in a clockwise spatial direction and a current 364 flows in a coil 354 in a counter-clockwise spatial direction such that coil 352 and coil 354 generate magnetic fields that have opposite polarities at any given point in time. These magnetic fields with opposite polarities form closed flux lines 366 between coil 352 and coil 354. As shown in FIG. 3B, wheel coil structure 300 is aligned with transmitter coil structure 350 such that flux lines 366 pass through coil 340. Spoke portion 316a and spoke portion 316b of wheel core 310 enhance the magnetic coupling of flux lines 366 through coil 340. The time-varying magnetic field represented by flux lines 366 passing through coil 340 induces a time-varying current 372 in coil 340. In one embodiment, coil 340 is coupled to a receiver circuit (not shown) such that current 372 is input to the receiver circuit that produces an output voltage that can be used to charge a battery or power an electronic device.

Wheel coil structure 300 can also receive wireless power from a single coil wireless power transmitter such as wireless power transmitter 100 of FIG. 1A. When in close proximity to a transmitting surface of a single coil wireless power transmitter emitting a magnetic field, a time-varying current will be induced in coil 320 of wheel coil structure 300. In such an embodiment, solenoidal coils 330 and 340 will capture little to no magnetic flux from the single coil wireless power transmitter but spoke portions 314a, 314b, 316a, and 316b of wheel core 310 enhance the coupling of the magnetic flux with coil 320. Thus wheel coil structure 300 is capable of receiving wireless power from either an opposite polarity coil wireless power transmitter or a single coil wireless power transmitter.

Figure 4A:
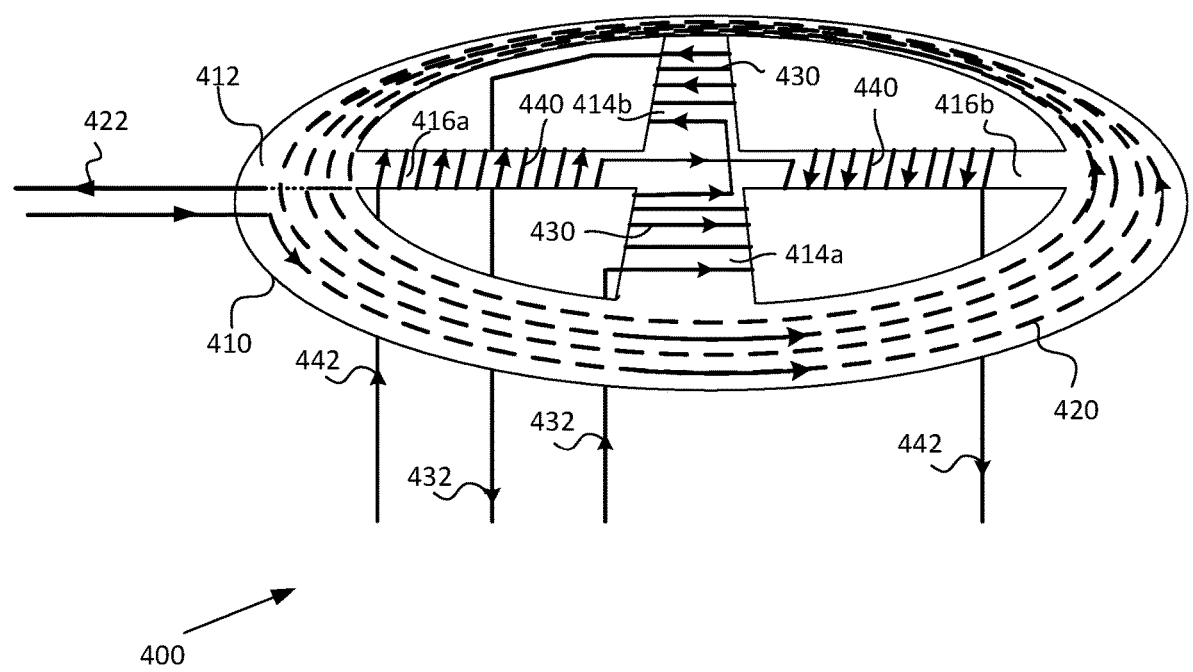
FIG. 4A is a diagram of one embodiment of a wheel coil structure for wireless power transfer, according to the invention.

FIG. 4A is a diagram of one embodiment of a wheel coil structure for wireless power transfer, according to the invention. Wheel coil structure 400 includes, but is not limited to, a wheel core 410, a coil 420, a coil 430, and a coil 440. Coil 420 is a spiral coil shown as being located on the underside of an annulus portion 412 of wheel core 410. In one embodiment, coil 420 is attached to the outer surface of annulus portion 412 with an adhesive. Coil 430 is a solenoidal coil wrapped around a spoke portion 414a and a spoke portion 414b of wheel core 410. Coil 430 is wound around spoke portions 414a and 414b in such a way that when a current 432 is flowing in a first spatial direction in a portion of coil 430 wound around spoke portion 414a, current 432 is flowing in a second spatial direction in a portion of coil 430 wound around spoke portion 414b. For example, when current 432 is flowing in a clockwise spatial direction in the portion of coil 430 wound around spoke portion 414a, current 432 is flowing in a counter-clockwise spatial direction in the portion of coil 430 wound around spoke portion 414b (current 432 flows in a single electrical direction in coil 430 at any given point in time). Coil 440 is a solenoidal coil wrapped around a spoke portion 416a and a spoke portion 416b of wheel core 410. Coil 440 is wound around spoke portions 416a and 416b in such a way that when a current 442 is flowing in a first spatial direction in a portion of coil 440 wound around spoke portion 416a, current 442 is flowing in a second spatial direction in a portion of coil 440 wound around spoke portion 416b. For example, when current 442 is flowing in a clockwise spatial direction in the portion of coil 440 wound around spoke portion 416a, current 442 is flowing in a counter-clockwise spatial direction in the portion of coil 440 wound around spoke portion 416b (current 442 flows in a single electrical direction in coil 440 at any given point in time).

Figure 4B:
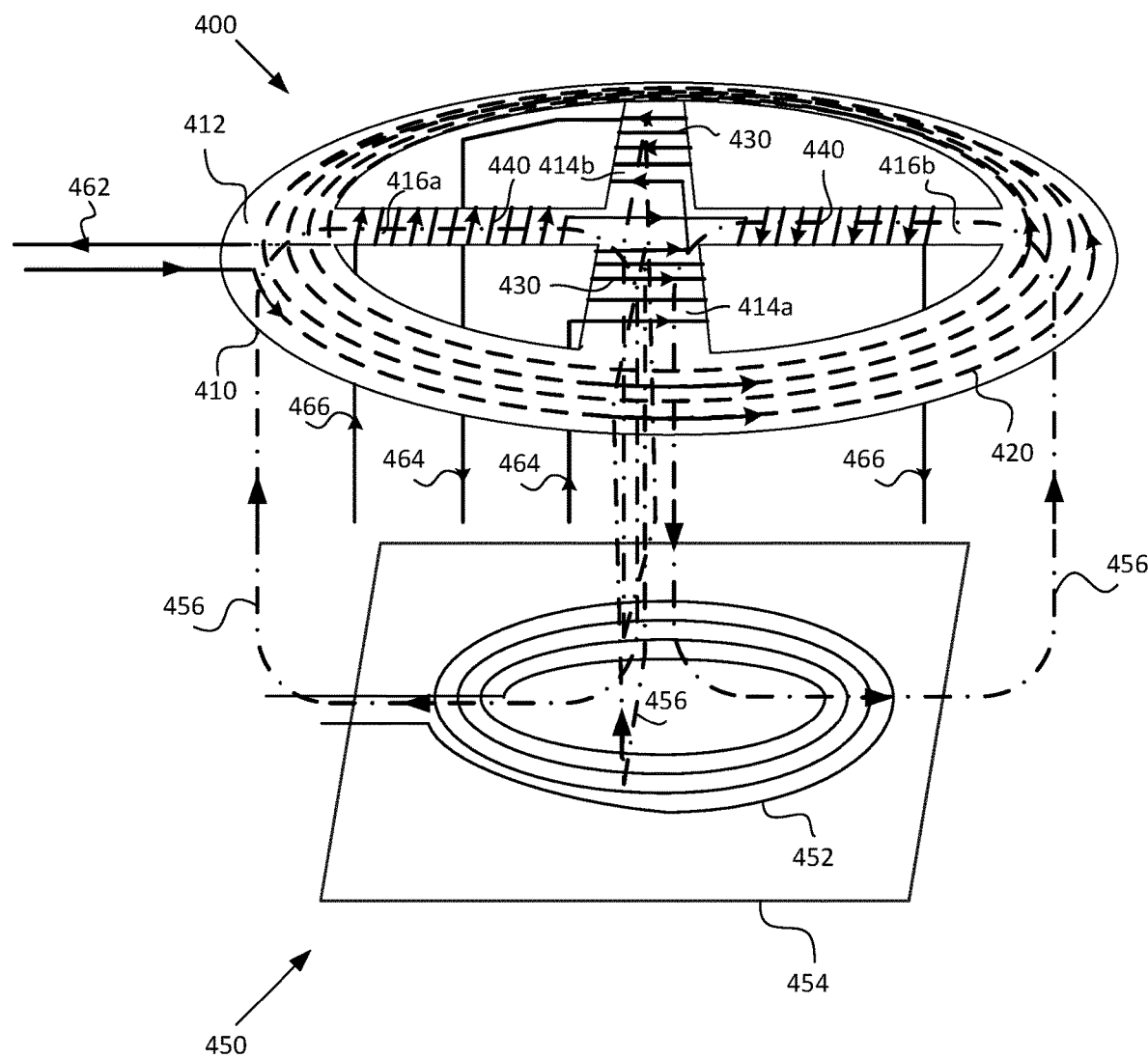
FIG. 4B is a diagram of one embodiment of a coil of the wheel coil structure of FIG. 4A receiving power from a wireless power transmitter, according to the invention.

In one embodiment, wheel coil structure 400 is implemented as a wireless power receiver coil structure. FIG. 4B is a diagram of one embodiment of a coil of the wheel coil structure of FIG. 4A receiving power from a wireless power transmitter, according to the invention. A wireless power transmitter single coil structure 450, which includes a coil 452 and a layer of magnetic material 454, generates a time-varying magnetic field represented by flux lines 456. As shown in FIG. 4B, wheel coil structure 400 is aligned with transmitter coil structure 450 such that flux lines 456 pass through coil 420, coil 430, and coil 440. Spoke portion 414a and spoke portion 414b of wheel core 410 enhance the magnetic coupling of flux lines 456 through coil 430 and coil 420. Spoke portion 416a and spoke portion 416b of wheel core 410 enhance the magnetic coupling of flux lines 456 through coil 440 and coil 420. The time-varying magnetic field represented by flux lines 456 passing through coil 420 induces a time-varying current 462 in coil 420. The time-varying magnetic field represented by flux lines 456 passing through coil 430 induces a time-varying current 464 in coil 430. Similarly, the time-varying magnetic field represented by flux lines 456 passing through coil 440 induces a time-varying current 466 in coil 440. In one embodiment, one or more of coil 420, coil 430, and coil 440 are coupled to a receiver circuit (not shown) such that one or more of currents 462, 464, and 466 are input to the receiver circuit that produces an output voltage that can be used to charge a battery or power an electronic device.

Figure 5:
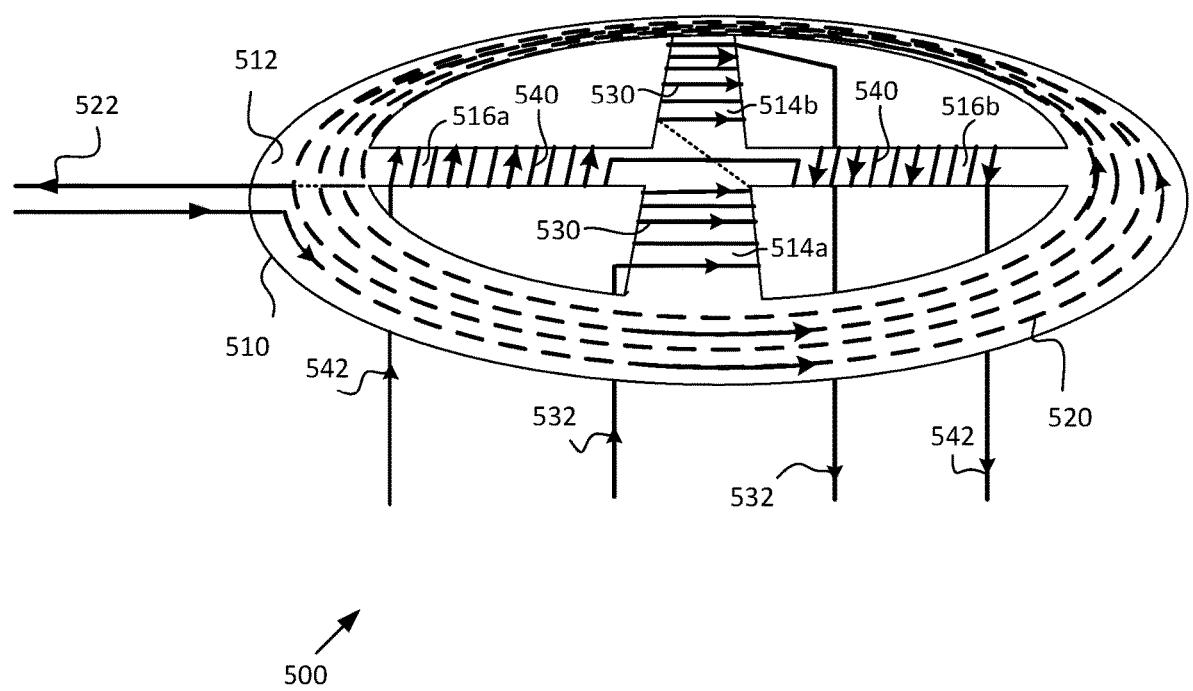
FIG. 5 is a diagram of one embodiment of a wheel coil structure for wireless power transfer, according to the invention.

FIG. 5 is a diagram of one embodiment of a wheel coil structure 500 for wireless power transfer, according to the invention. Wheel coil structure 500 includes, but is not limited to, a wheel core 510, a coil 520, a coil 530, and a coil 540. Coil 520 is a spiral coil shown as being located on the underside of an annulus portion 512 of wheel core 510. In one embodiment, coil 520 is attached to the outer surface of annulus portion 512 with an adhesive. Coil 530 is a solenoidal coil wrapped around a spoke portion 514a and a spoke portion 514b of wheel core 510. Coil 530 is wound around spoke portions 514a and 514b in such a way that when a current 532 is flowing in a first spatial direction in a portion of coil 530 wound around spoke portion 514a, current 432 is also flowing in the first spatial direction in a portion of coil 530 wound around spoke portion 514b. For example, when current 532 is flowing in a clockwise spatial direction in the portion of coil 530 wound around spoke portion 514a, current 532 is also flowing in a clockwise spatial direction in the portion of coil 530 wound around spoke portion 514b (current 532 flows in a single electrical direction in coil 530 at any given point in time). Coil 540 is a solenoidal coil wrapped around a spoke portion 516a and a spoke portion 516b of wheel core 510. Coil 540 is wound around spoke portions 516a and 516b in such a way that when a current 542 is flowing in a first spatial direction in a portion of coil 540 wound around spoke portion 516a, current 542 is flowing in a second spatial direction in a portion of coil 540 wound around spoke portion 516b. For example, when current 542 is flowing in a clockwise spatial direction in the portion of coil 540 wound around spoke portion 516a, current 542 is flowing in a counter-clockwise spatial direction in the portion of coil 540 wound around spoke portion 516b (current 542 flows in a single electrical direction in coil 540 at any given point in time).

Wheel coil structure 500 is configured to receive wireless power from either a single coil wireless power transmitter, such as transmitter 100 of FIG. 1A or an opposite polarity coil wireless power transmitter, such as transmitter 130 of FIG. 1B. When wheel coil structure 500 is in close proximity to a transmitting surface of a single coil wireless power transmitter emitting a magnetic field, the magnetic flux will induce time-varying currents in coil 520 and coil 540. When wheel coil structure 500 is in close proximity to a transmitting surface of an opposite polarity wireless power transmitter emitting a magnetic field and spokes 514a and 514b are substantially parallel to an axis defined by the centers of the pair of opposite polarity transmitter coils, the magnetic flux will induce a time-varying current in coil 530.

FIGS. 6A-6E are circuit diagrams of various embodiments of wireless power receiver systems including a wheel receiver coil structure, according to the invention. Each of FIGS. 6A-6E includes three receiver coils, one coil 610 that represents a coil located on an outer surface of an annulus portion of a wheel core and two coils, for example coil 612 and coil 614, that represent solenoidal coils wound around spoke portions of the wheel core. Although two solenoidal coils are shown in FIGS. 6A-6E, embodiments of wireless power receiver systems having different numbers of solenoidal coils, for example one, three, or four, are within the scope of the invention. In various embodiments, the circuit diagrams of FIGS. 6A-6E represent wireless power receivers having a wheel coil structure such as wheel coil structure 300 of FIG. 3A, wheel coil structure 400 of FIG. 4A, or wheel coil structure 500 of FIG. 5. For example, the circuit diagram of FIG. 6A may represent a wireless power receiver system including an embodiment of wheel coil structure 300 in which coil 320, coil 330, and coil 340 are coupled together in series.

Figure 6A:
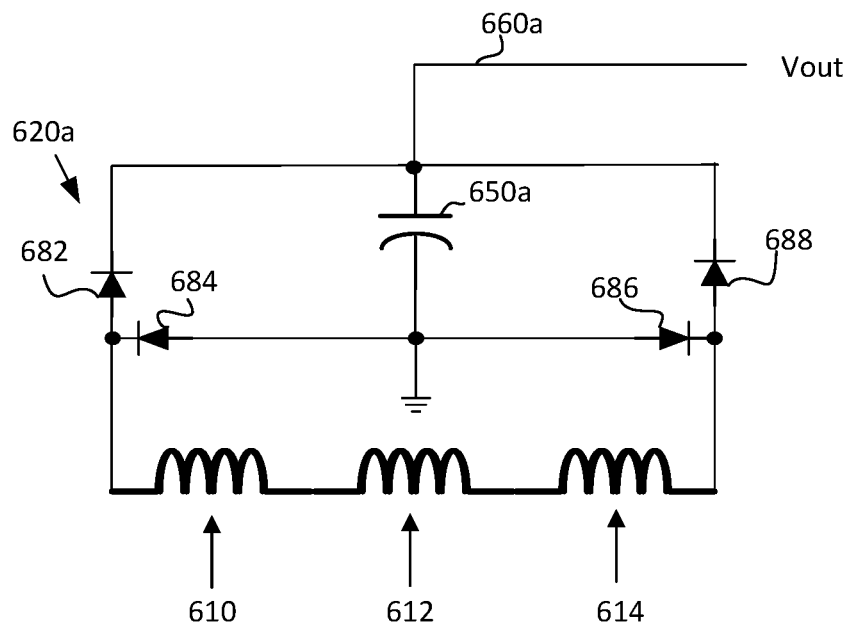
FIGS. 6A-6E are circuit diagrams of various embodiments of a wireless power receiver system including a wheel receiver coil structure, according to the invention.

FIG. 6A is a circuit diagram of one embodiment of a wireless power receiver system including a coil 610, a coil 612, and a coil 614 coupled in series. The series of coils 610, 612, and 614 is coupled to a rectifier circuit 620a that includes four diodes 682, 684, 686, and 688 configured as a full-bridge circuit. Rectifier circuit 620a is also coupled to a capacitor 650a. A wireless power signal received by one or more of coils 610, 612, and 614 is rectified by rectifier circuit 620a and an output voltage Vout is provided at an output rail 660a. The output voltage Vout may be input to a voltage regulator (not shown) that provides an output voltage for charging a battery or powering an electronic device.

Figure 6B:
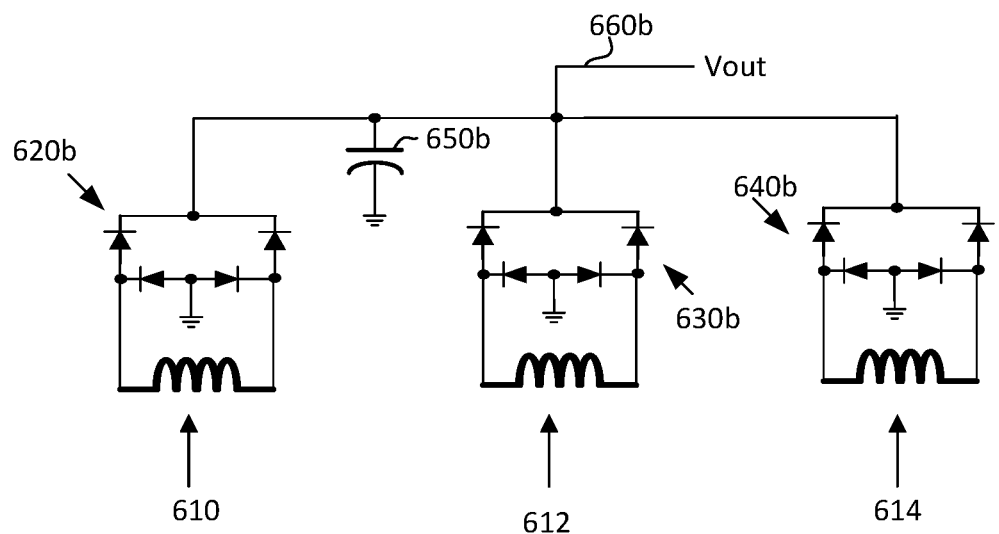

FIG. 6B is a circuit diagram of one embodiment of a wireless power receiver system including a coil 610 coupled to a rectifier circuit 620b, a coil 612 coupled to a rectifier circuit 630b, and a coil 614 coupled to a rectifier circuit 640b. Each of rectifier circuit 620b, rectifier circuit 630b, and rectifier circuit 640b is a full-bridge diode circuit that includes four diodes. In the FIG. 6B embodiment, the rectifier circuits 620b, 630b, and 640b perform an OR-ing function such that the one of coils 610, 612, and 614 that receives the most magnetic flux provides received power across a capacitor 650b to output rail Vout 660b.

Figure 6C:
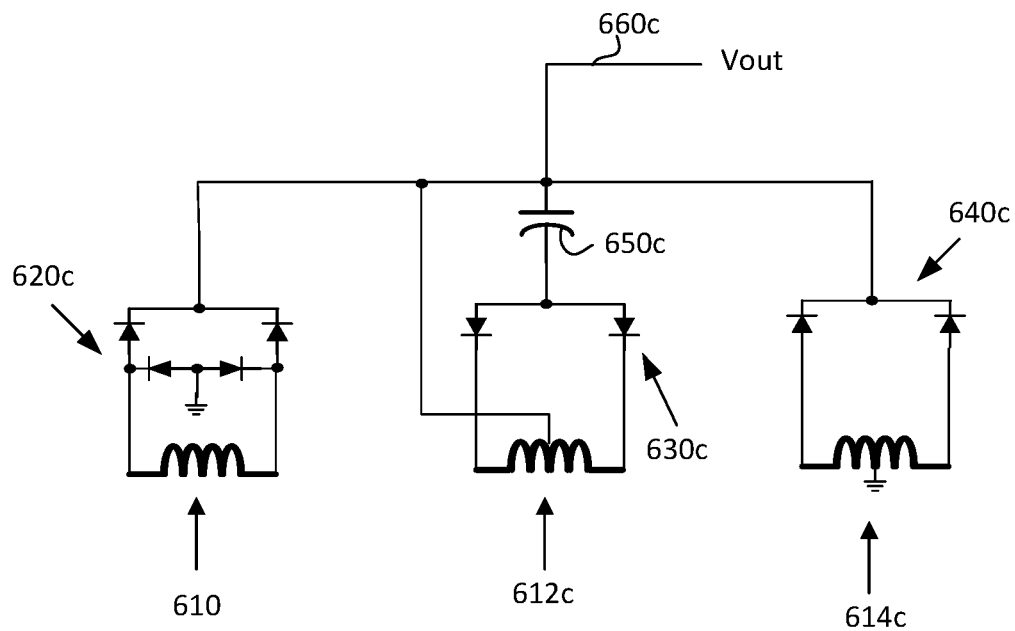
Figure 6D:
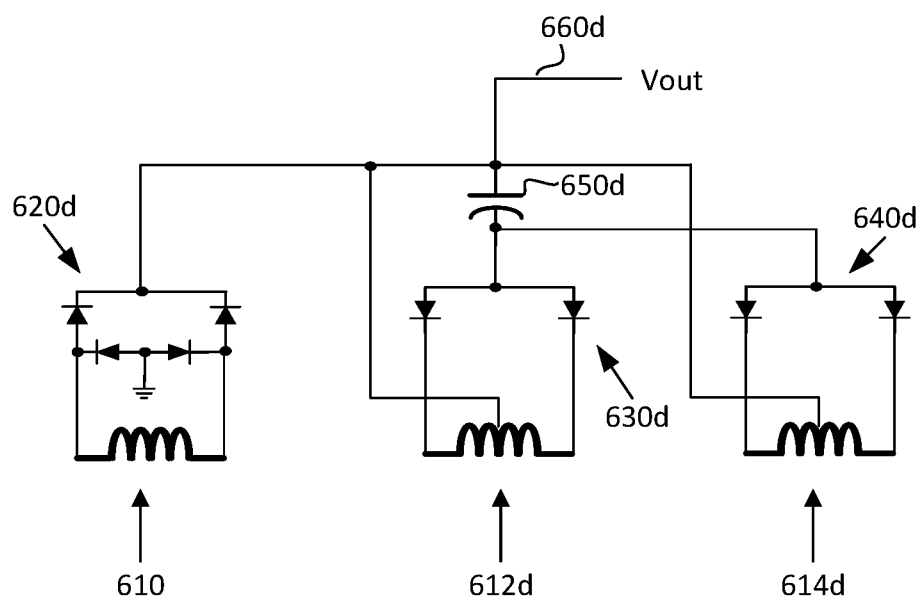
Figure 6E:
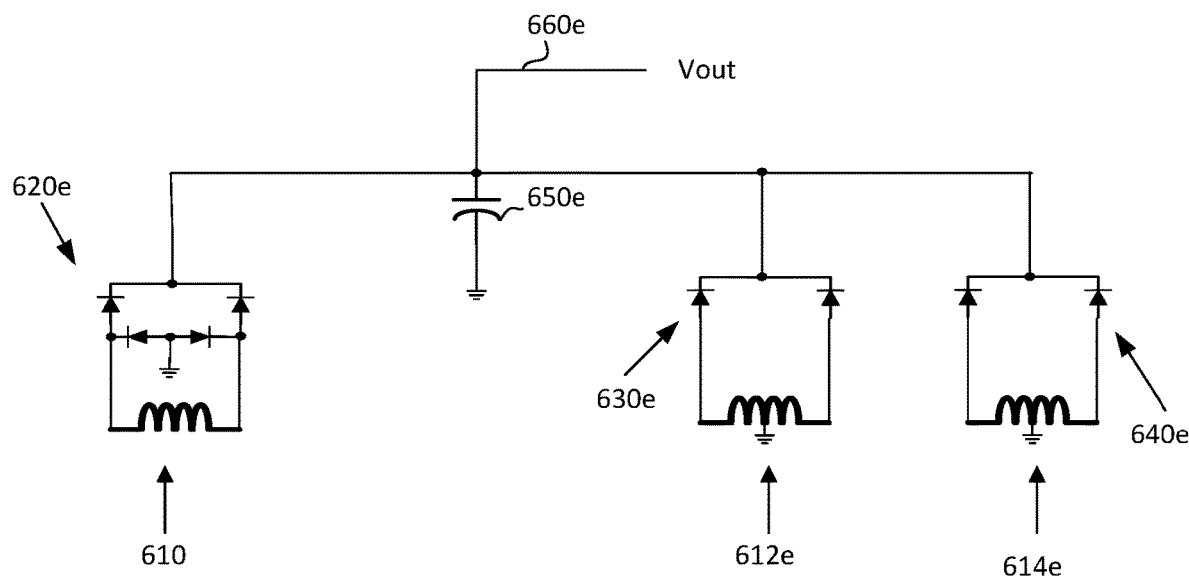

FIG. 6C is a circuit diagram of a wireless power receiver system including a coil 610 coupled to a rectifier circuit 620c, a coil 612c coupled to a rectifier circuit 630c, and a coil 614c coupled to a rectifier circuit 640c. In the FIG. 6C embodiment, rectifier circuit 630c includes two diodes and is configured as a low-side half-bridge circuit, where coil 612c is center-tapped. In this embodiment, rectifier circuit 640c includes two diodes and is configured as a high-side half-bridge circuit, where coil 614 is center-tapped to ground. The rectifier circuits 620c, 630c, and 640c perform an OR-ing function such that the one of coils 610, 612c, and 614c that receives the most magnetic flux provides received power across a capacitor 650c to an output rail Vout 660c. FIGS. 6D and 6E are circuit diagrams of embodiments of wireless power receiver systems with other embodiments of wheel coil structures with center-tapped solenoidal coils. In the FIG. 6D embodiment, a rectifier circuit 630d and a rectifier circuit 640d are both configured as low-side half-bridge circuits. A solenoidal coil 612d has a center-tap coupled to a capacitor 650d and a solenoidal coil 614d has a center-tap coupled to capacitor 650d. In the FIG. 6E embodiment, a rectifier circuit 630e and a rectifier circuit 640e are both configured as high-side half-bridge circuits. Each of a solenoidal coil 612e and a solenoidal coil 614e has a center-tap coupled to ground.

Figure 6F:
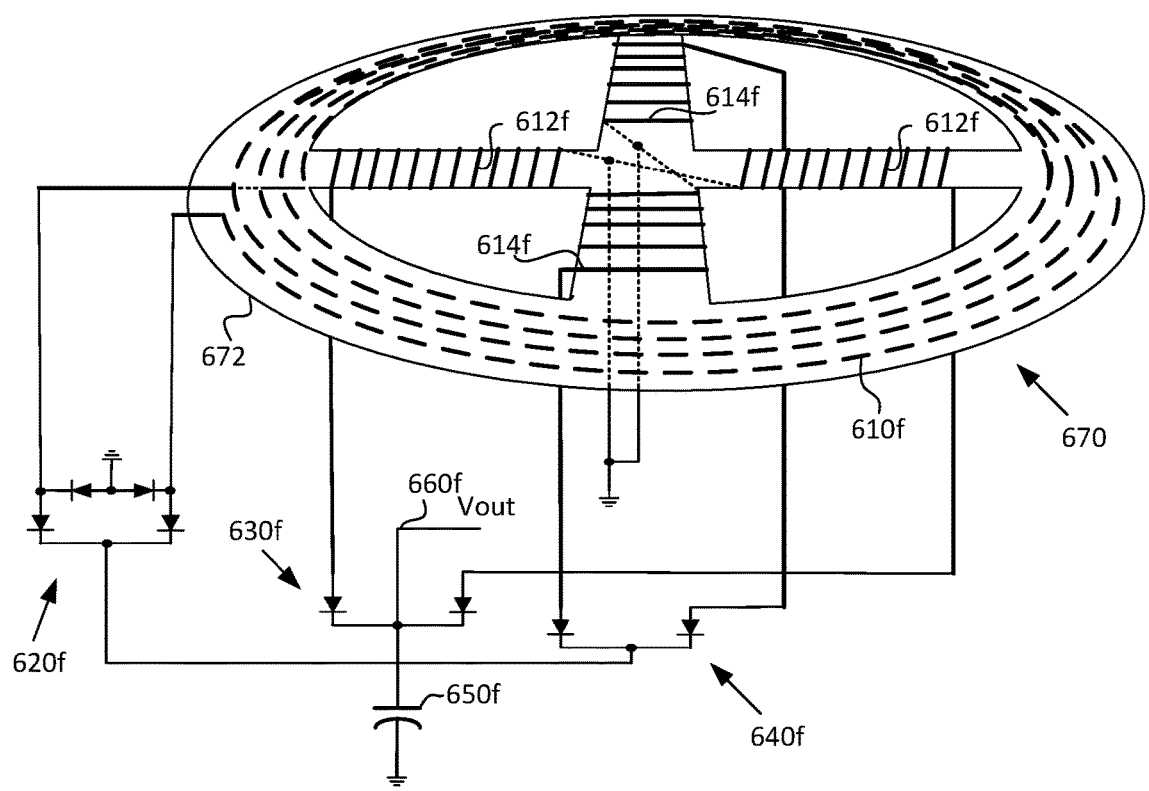
FIG. 6F is a diagram of one embodiment of a wireless power receiver system including a wheel receiver coil structure, according to the invention.

FIG. 6F is a diagram of one embodiment of a wireless power receiver system including a wheel receiver coil structure 670, according to the invention. Wheel receiver coil structure 670 includes a wheel core 672, a coil 610f, a solenoidal coil 612f, and a solenoidal coil 614f. Coil 610f is coupled to a full-bridge rectifier circuit 620f. Solenoidal coil 612f is coupled to a half-bridge rectifier circuit 630f and center-tapped to ground. Solenoidal coil 614f is coupled to a half-bridge rectifier circuit 640f and center-tapped to ground. The rectifier circuits 620f, 630f, and 640f perform an OR-ing function such that the one of coils 610f, 612f, and 614f that receives the most magnetic flux provides received power across a capacitor 650f to an output rail Vout 660f. The longitudinal nature of solenoid coils 612f and 614f allows them to be center-tapped, such that the wireless power receiver system can advantageously include 2-diode half-bridge rectifier circuits.

Figure 7:
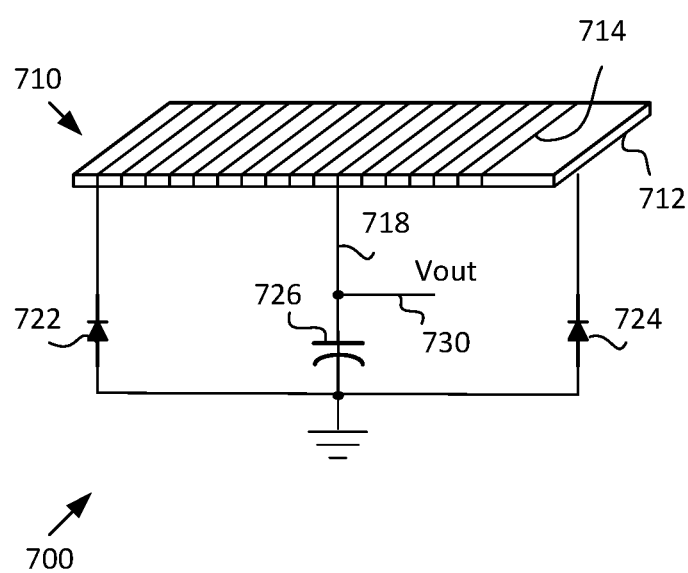
FIG. 7 is a diagram of one embodiment of a longitudinal receiver coil structure coupled to a half-bridge rectifier circuit, according to the invention.

In other embodiments, a wireless power receiver system includes one or more center-tapped solenoid receiver coils coupled to a half-bridge rectifier circuit, where the one or more solenoid receiver coils is wound around a longitudinal magnetic core. FIG. 7 is a diagram of one embodiment of a longitudinal wireless power receiver coil structure coupled to a half-bridge rectifier circuit, according to the invention. A wireless power receiver system 700 includes, but is not limited to, a longitudinal receiver coil structure 710, which includes a core 712 made of a magnetic material such as ferrite and a solenoidal coil 714 wound around the core 712. In the FIG. 7 embodiment core 712 is in the shape of a parallelepiped with a thickness of approximately 2-5 millimeters. In other embodiments, core 712 may be in the shape of a circular or elliptical cylinder. Receiver coil structure 710 is coupled to a half-bridge rectifier circuit that includes a diode 722 and a diode 724. A center-tap 718 of coil 714 is coupled to a capacitor 726. When magnetic flux from a wireless power transmitter, such as wireless power transmitter 130 of FIG. 1B, induces a time-varying current in coil 714, diodes 722 and 724 rectify the signal which is filtered by capacitor 726 to provide an output voltage on a voltage rail 730.

Figure 8:
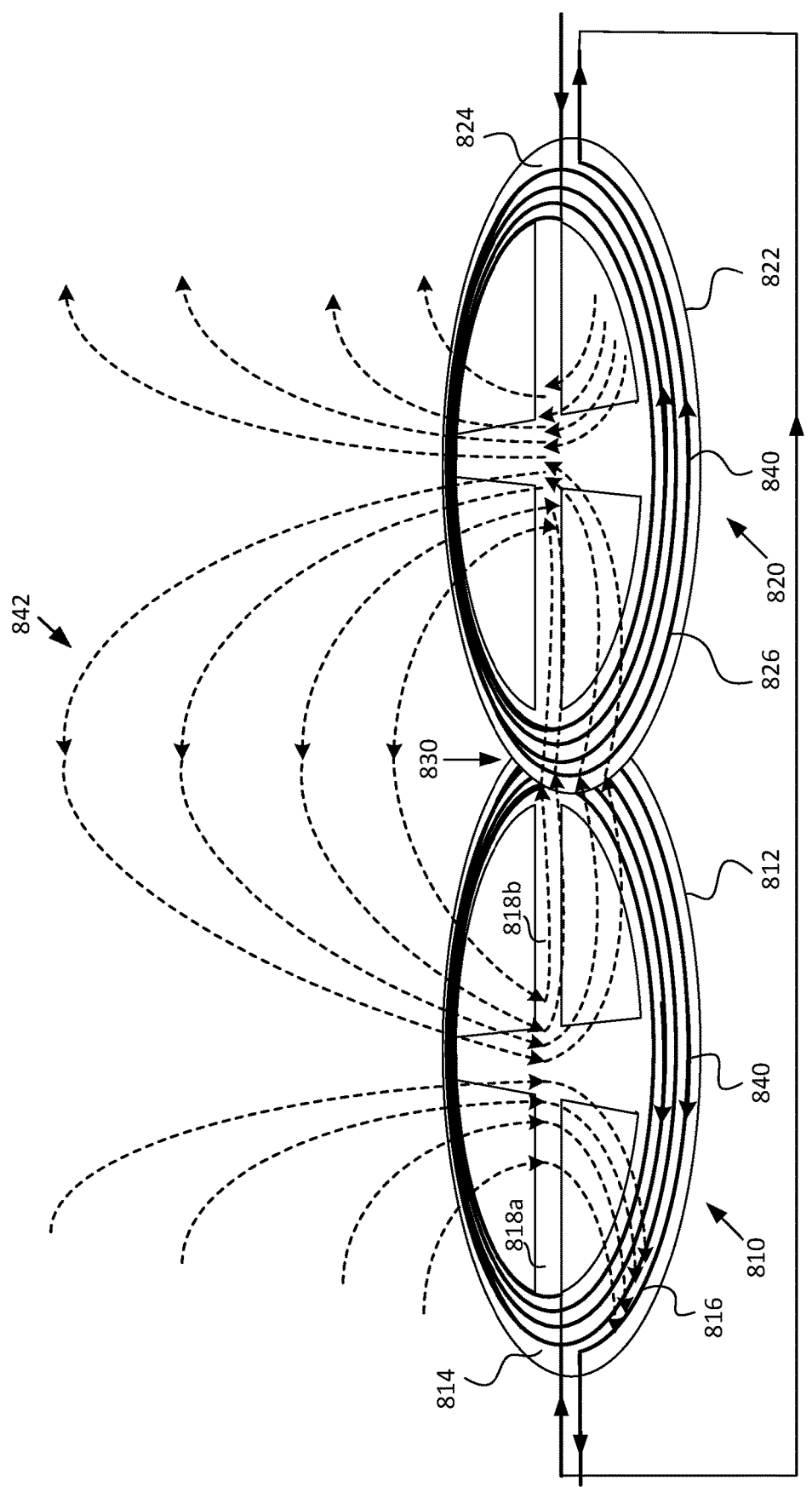
FIG. 8 is a diagram of one embodiment of an opposite polarity wheel coil structure for wireless power transfer, according to the invention.

FIG. 8 is a diagram of one embodiment of an opposite polarity wheel coil structure 800 for wireless power transfer, according to the invention. Opposite polarity wheel coil structure 800 includes a wheel coil structure 810 and a wheel coil structure 820. Wheel coil structure 810 includes a wheel core 812 made of a magnetic material such as ferrite and a coil 816 located on an outer surface of an annulus portion 814 of wheel coil 810. Wheel coil structure 820 includes a wheel core 822 made of a magnetic material such as ferrite and a coil 826 located on an outer surface of an annulus portion 824 of wheel coil 812. In the FIG. 8 embodiment, each of wheel core 812 and wheel core 822 has four spoke portions arranged symmetrically with respect to a geometric center of their respective wheel core. In other embodiments, one or both of wheel core 812 and wheel core 822 have a different number of spoke portions. Wheel coil structure 810 and wheel coil structure 820 overlap in an area 830 such that wheel core 812 and wheel core 822 are in contact. In the FIG. 8 embodiment, wheel core 812 and wheel core 822 overlap in area 830 and coil 816 and coil 826 overlap in area 830. In other embodiments, only wheel core 812 and wheel core 822 overlap in area 830. In another embodiment, instead of overlapping, wheel core 812 and wheel core 822 are connected at a point along the outer edge of their annulus portions 814 and 824. In another embodiment, wheel core 812 and wheel core 822 are formed from a single piece of magnetic material.

Coil 816 and coil 826 preferably have the same number of turns and the same area. Coil 816 is coupled in series with coil 826 such that when a time-varying current 840 is flowing in coil 816 in a clockwise spatial direction, current 840 is flowing in coil 826 in a counter-clockwise spatial direction. Because current 840 flows in opposite spatial directions in coil 816 and coil 826 at any given point in time, the magnetic field generated from coil 816 is in a different direction than the magnetic field generated from coil 826 (i.e., the magnetic fields have different polarity). Further, magnetic flux between coil 816 and coil 826 attract each other and magnetically couple to form closed flux lines 842. Wheel coil structure 800 can be implemented as a wireless power transmitter coil structure or a wireless power receiver structure. In one embodiment of opposite polarity wheel coil structure 800 as a receiver structure, one or more of wheel core 812 and wheel core 822 includes a solenoidal coil (not shown) wound around an opposing pair of spoke portions, for example a spoke portion 818a and a spoke portion 818b of wheel core 812.

Figure 9:
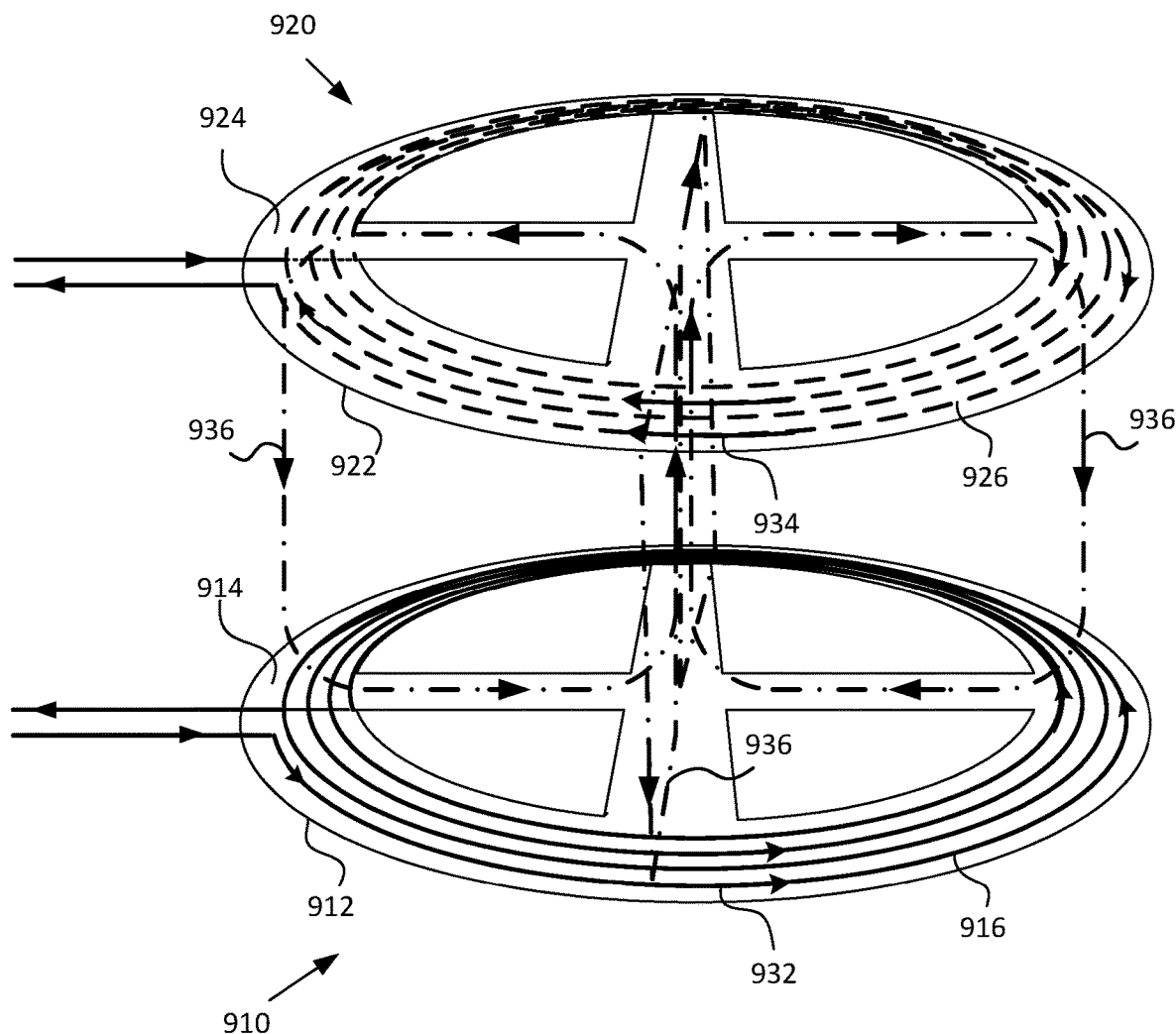
FIG. 9 is a diagram of one embodiment of a wheel transmitter coil structure and a wheel receiver coil structure, according to the invention.

FIG. 9 is a diagram of one embodiment of a wheel transmitter coil structure 910 and a wheel receiver coil structure 920, according to the invention. Wheel transmitter coil structure 910 includes a wheel core 912 of magnetic material and a coil 916 located on an outer surface of an annulus portion 914 of wheel core 912. Wheel receiver coil structure 920 includes a wheel core 922 of magnetic material and a coil 926 located on an outer surface of an annulus portion 924 of wheel core 922. FIG. 9 shows coil 916 on a top side of annulus portion 914 of wheel core 912 and coil 926 on an underside of annulus portion 924 of wheel core 922. In the FIG. 9 embodiment, none of wheel transmitter coil structure 910 and wheel receiver coil structure 920 includes solenoidal coils wrapped around spoke portions of wheel core 912 or wheel core 922; in other embodiments one or both of wheel transmitter coil structure 910 and wheel receiver coil structure 920 may include one or more solenoidal coils.

A power circuit (not shown) provides a time-varying current 932 to coil 916. When current 932 is flowing in a counter-clockwise spatial direction in coil 916, wheel transmitter coil structure 910 produces a time-varying magnetic field represented by flux lines 936. Wheel receiver coil structure 920 is aligned in proximity to wheel transmitter coil structure 910 such that flux lines 936 induce a time-varying current 934 in coil 926. Spoke portions of wheel core 912 and spoke portions of wheel core 922 act as pathways for flux lines 936 of the magnetic field produced by coil 916, which enhances the transfer of power from wheel transmitter coil structure 910 to wheel receiver coil structure 920.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A wireless power transfer coil structure comprising:
   a wheel core formed from a magnetic material, the wheel core comprising:
      an annulus portion having an outer surface and an inner surface; and
      at least two spoke portions arranged substantially symmetrically with respect to a geometric center of the annulus portion, wherein each spoke portion of the at least two spoke portions has an end portion that connects to the inner surface of the annulus portion; and
   a coil located on the outer surface of the annulus portion of the wheel core.

2. The wireless power transfer coil structure of claim 1, further comprising at least one solenoidal coil wound around the at least two spoke portions of the wheel core.

3. The wireless power transfer coil structure of claim 2, wherein the at least one solenoidal coil is wound around one of the at least two spoke portions of the wheel core in a first direction and wound around another of the at least two spoke portions of the wheel core in the first direction.

4. The wireless power transfer coil structure of claim 2, wherein the at least one solenoidal coil is wound around one of the at least two spoke portions of the wheel core in a first direction and wound around another of the at least two spoke portions of the wheel core in a second direction different from the first direction.

5. The wireless power transfer coil structure of claim 2, wherein the coil is coupled to a full-bridge rectifier circuit and the at least one solenoidal coil is coupled to a half-bridge rectifier circuit.

6. The wireless power transfer coil structure of claim 2, wherein the wheel core comprises at least four spoke portions arranged substantially symmetrically around the geometric center of the annulus portion and the solenoidal coil is wound around a first pair of the at least four spoke portions, and further comprising a second solenoidal coil wound around a second pair of the at least four spoke portions.

7. The wireless power transfer coil structure of claim 6, wherein the coil located on the annulus portion of the wheel core, the solenoidal coil, and the second solenoidal coil are coupled together in series.

8. The wireless power transfer coil structure of claim 6, wherein the coil located on the annulus portion of the wheel core is coupled to a first rectifier circuit, the solenoidal coil is coupled to a second rectifier circuit, and the second solenoidal coil is coupled to a third rectifier circuit.

9. The wireless power transfer coil structure of claim 8, wherein each of the first rectifier circuit, the second rectifier circuit, and the third rectifier circuit is a full-bridge rectifier circuit.

10. The wireless power transfer coil structure of claim 8, wherein the first rectifier circuit is a full-bridge rectifier circuit and one or more of the second rectifier circuit and the third rectifier circuit is a half-bridge rectifier circuit.

11. The wireless power transfer coil structure of claim 1, further comprising:
   a second wheel core comprising an annulus portion and at least two spoke portions arranged substantially symmetrically with respect to a geometric center of the annulus portion, the second wheel core formed from a magnetic material; and
   a second coil located on an outer surface of the annulus portion of the second wheel core, wherein a portion of the annulus portion of the wheel core is in physical contact with a portion of the annulus portion of the second wheel core.

12. A wireless power transfer coil structure comprising:
   a wheel core being made of a magnetic material comprising:
      a first annulus portion;
      a second annulus portion;
      at least two spoke portions arranged substantially symmetrically with respect to a center of the first annulus portion, wherein each spoke portion of the at least two spoke portions has an end portion that connects to an inner surface of the first annulus portion;
      at least two spoke portions arranged substantially symmetrically with respect to a center of the second annulus portion, wherein each spoke portion of the at least two spoke portions has an end portion that connects to an inner surface of the second annulus portion; and
   a first coil located on an outer surface of the first annulus portion of the wheel core; and
   a second coil located on an outer surface of the second annulus portion of the wheel core.

13. The wireless power transfer coil structure of claim 12, further comprising at least one solenoidal coil wound around the at least two spoke portions arranged substantially symmetrically with respect to a center of the first annulus portion of the wheel core.

14. The wireless power transfer coil structure of claim 13, wherein the at least one solenoidal coil is wound around one of the at least two spoke portions in a first direction and wound around another of the at least two spoke portions in the first direction.

15. The wireless power transfer coil structure of claim 13, wherein the at least one solenoidal coil is wound around one of the at least two spoke portions in a first direction and wound around another of the at least two spoke portions in a second direction different from the first direction.

16. The wireless power transfer coil structure of claim 12, wherein the first coil is coupled in series with the second coil, the first coil and the second coil being wound in such a way that when a current flows in a first spatial direction in the first coil the current flows in a second spatial direction different from the first spatial direction in the second coil.

17. The wireless power transfer coil structure of claim 1, wherein the at least two spoke portions are containing within the inner portion of the annulus portion.

18. The wireless power transfer coil structure of claim 12, wherein the at least two spoke portions arranged substantially symmetrically with respect to a center of the first annulus portion are contained within the inner portion of the first annulus portion.

19. The wireless power transfer coil structure of claim 12, wherein the at least two spoke portions arranged substantially symmetrically with respect to a center of the second annulus portion are contained within the inner portion of the second annulus portion.

\* \* \* \* \*